Aug. 3, 1954
W. D. PEEL
2,685,313
SEED ORIENTING AND GRIPPING MEANS
FOR FRUIT PITTING MACHINES
Filed Nov. 28, 1951
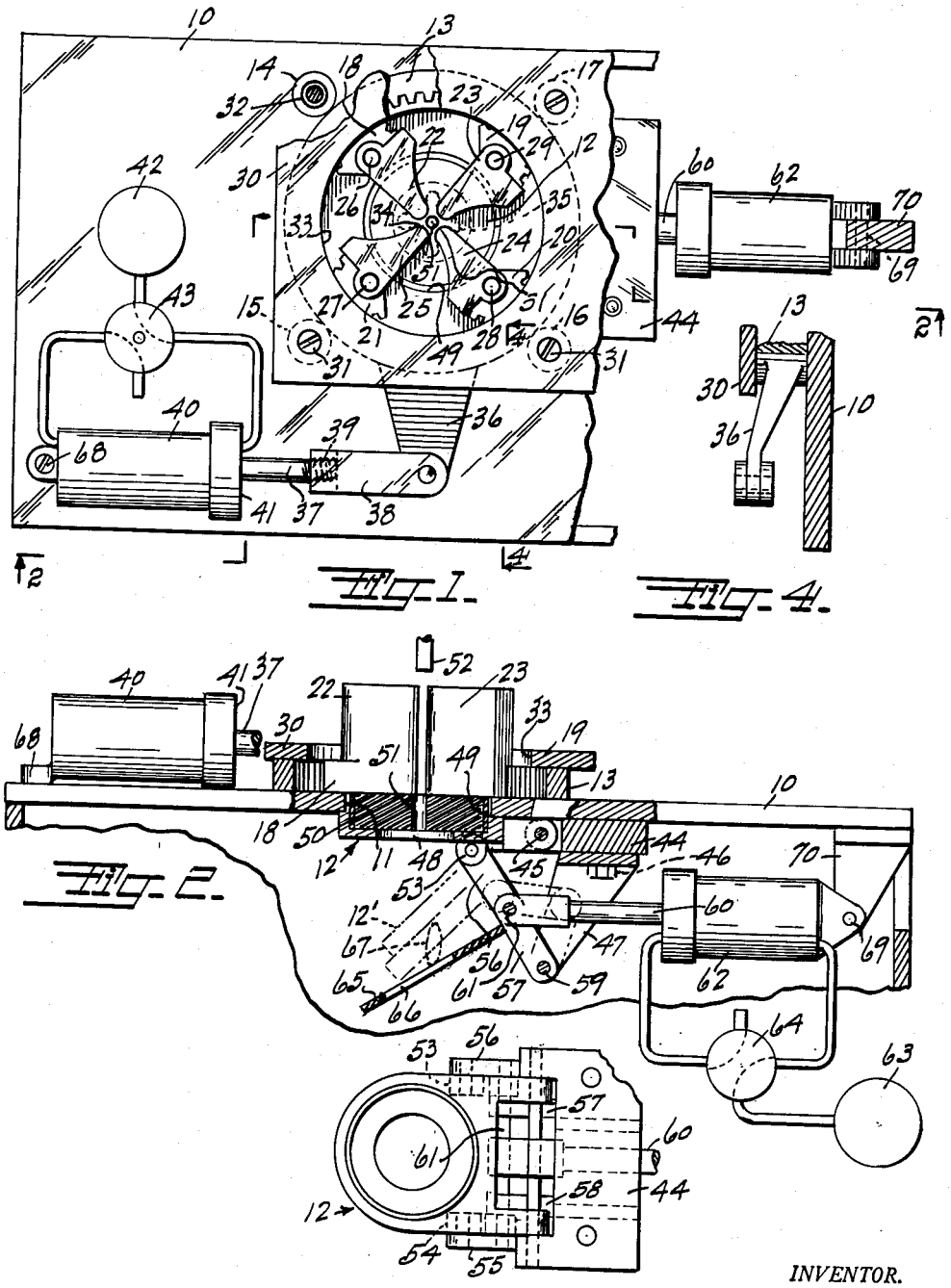
INVENTOR.
Wirt D. Peel
BY
Attorney Patented Aug. 3, 1954

2,685,313

UNITED STATES PATENT OFFICE 2,685,313

SEED ORIENTING AND GRIPPING MEANS
FOR FRUIT PITTING MACHINES

Wirt D. Peel, Oakland, Calif.

Application November 28, 1951, Serial No. 258,681

2 Claims. (Cl. 146—17)

This invention relates to improvements in means for aligning the seed in a fruit with the seed ejecting plunger of a fruit pitting machine, and also to the discharge and segregation of the seeds and pitted fruits. This invention is applicable for use in connection with fruit pitting machines of the type covered by my Patent No. 2,485,653, dated October 25, 1949, and provides a new and simplified gripping arrangement which actually centers and aligns the seed within the fruit with the seed ejecting plunger, thus assuring positive ejection of the seed without any possibility of rupturing or breaking the seed.

This invention is particularly adapted for centering and holding the seeds within prunes for pitting, though it is equally suitable for use in conection with dates and similar varieties of fruits, the gripping means consisting of four fingers which have rounded engaging ends so as to prevent rupturing of the skin of the fruit, and these engaging edges are suitably laterally spaced to permit the intervening portions of the pulp and skin to bulge therebetween as the gripping elements press inwardly toward the seed, the idea being to actually center the seed with the ejection plunger instead of centering the fruit, and which is accomplished by this invention.

This invention is of the utmost simplicity in construction and operation and can be hand operated, or may be operated by any suitable source of power, though the preferred method of operation is by means of pneumatic jacks as illustrated and which provide sufficient resiliency to avoid crushing or rupturing the seed.

The objects and advantages of the invention are as follows:

First, to provide means for centering and holding the seed within a fruit in alignment with the ejection plunger of a fruit pitting machine for positive and efficient pitting.

Second, to provide means as outlined which will actually orient and grip the seed through the intervening skin of the fruit without rupturing the skin.

Third, to provide means as outlined in which the holding elements have rounded contacting edges laterally spaced to prevent rupture of the skin while allowing flow of the body of the fruit between the elements as they close to grip the seed.

Fourth, to provide means as outlined which is adaptable to pitting machines having plunger type seed ejectors.

Fifth, to provide means as outlined with an elastic cushion seat for the fruit and provided with an expansible aperture for passage of the seed as ejected from the fruit.

Sixth, to provide said cushion seat mounted in a retractable gate for discharge of the fruit after pitting, and to provide means including said gate for segregating the seeds and pitted fruits as discharged.

Seventh, to provide a gate as outlined which is pneumatically closed and locked for fixed support during the pitting operation, and opened for discharge of the fruit after pitting, through a toggle joint operating means.

Eighth, to provide means as outlined which is simple in construction, economical to manufacture and easily and economically operable.

In describing the invention reference will be had to the accompanying drawings, in which:

Fig. 1 is a top plan view of the invention with a portion of the base plate broken away to show part of the underlying mechanism.

Fig. 2 is a section taken on line 2—2 of Fig. 1 and shows the fruit support and discharge gate in closed position and indicating the open or retracted position in dotted outline.

Fig. 3 is a top plan view of the gate and its support and operating means, with the elastic cushion seat removed.

Fig. 4 is a section taken on line 4—4 of Fig. 1.

The invention includes a base 10 having a bore 11 to receive the cushion portion of the gate 12. Rotatably supported on top of this base in axial registry with the hole 11 is an internal ring gear 13 which is axially maintained by the rollers 14, 15, 16 and 17, and meshing with this ring gear is a plurality of sector gears 18, 19, 20 and 21 which are respectively fixed to or integral with the respective gripping fingers 22, 23, 24 and 25, and which are pivoted to the base plate respectively at 26, 27, 28 and 29, the four fingers being the most effective number for accurate centering of the seed with the ejection plunger and for actual gripping of the seed through the intervening fruit skin with a minimum of intervening fruit pulp, the fingers having a height preferably equal to the major diameter of the largest fruit to be pitted.

A cover plate 30 is supported in clearing relation to the ring gear and sector gears, with the pivot screws 31 for the rollers passing through combination bushings and spacers 32 which provide the proper spacing between the base plate and cover plate for free movement of the rollers, ring gear, and sector gears, the cover plate having an axial opening 33 to clear the upwardly projecting portions of the fingers.

The inner contacting ends 34 of the fingers are formed substantially semi-cylindrical so as not to rupture the skins of the fruits, and ample lateral space is provided between these ends to permit the flow of the body of the fruit to bulge therebetween as indicated at 35 while permitting the rounded portions of the fingers to grip the seed through the intervening skin of the fruit. When the fingers are retracted, the space between the extremities is sufficient to freely receive a fruit.

An operating arm 36 is fixed to or integral with the ring gear and can be manually operated or power operated, as may be desired, and is illustrated as connected to the piston rod 37 through a yoke 38 in which the piston rod is adjustable as indicated at 39 for varying the stroke of the piston in the cylinder 40, the yoke acting as a stop when contacting the head 41 of the cylinder, and this cylinder is provided with a supply 42 of air under pressure which is controlled by a suitable valve mechanism, a four-way valve 43 being indicated as one suitable type of control.

Thus, when air is admitted to one end of the cylinder 40, the fingers are opened to a degree in conformity with the relative adjustment of the various elements. When a fruit is placed in the space between the retracted fingers, and the control means reversed, the fingers move in on an arc and roll the fruit about a vertical axis as they grip into the fruit to grip the seed, and likewise, when the fingers are retracted the same rolling action takes place, thereby preventing rupture of the skin of the fruit and positively freeing the pitted fruit for discharge.

Located beneath the fingers is the gate 12 which is hinged to a hinge plate 44 as indicated at 45, the hinge plate being suitably fixed to the underside of the base plate as by cap screws 46, the same cap screws coincidently being adaptable for coincidently securing the bracket 47 in position.

The gate is provided with an axial bore 48 and counterbore 49, and a cushion seat formed of resilient and elastic material such as natural or synthetic rubber or plastic of a similar nature is seated in the counterbore and suitably supported and secured as by a retainer ring 50, and this cushion fruit seat has a small axial bore 51 through which the seed is forced by the plunger 52 of a fruit pitting machine, the elastic material permitting seeds of diameters greater than the diameter of the hole to be forced through.

The gate has depending ears 53 and 54 to which are pivotally attached the upper toggle links 55 and 56 which in turn are pivotally connected to the lower toggle links 57 and 58 and which lower toggle links are pivoted at their lower ends to the bracket 47 as indicated at 59. The piston rod 60 is connected to the pivot 61 which connects the median ends of the toggle links. The cylinder 62 is provided with a supply 63 of air under pressure which is controlled by suitable means such as the four-way valve 64. A chute 65 has an opening 66 through which the pits fall when forced through the cushion fruit seat.

As will be noted, when the gate is closed it is rigidly locked in position by the toggle mechanism. The pit 67 which has been forced through the passage 51 falls through the passage 48 in the underside of the gate and down through the opening 66 in the chute. When the gate is retracted to the position indicated by the dotted image at 12' it covers the discharge hole 66 and the fruit slides off the top of the cushion seat onto the chute, thus segregating the pits from the pitted fruits.

For the pitting operation the gate is in the raised and locked position shown, and the fingers are retracted sufficiently to admit a fruit in vertical position. A fruit is placed in the space between the fingers, the fingers are closed through the medium of the pneumatic jack 40 to grip the seed, the plunger 52 is driven through the fruit forcing the seed down through the hole 51 which expands with larger seeds under forcing by the plunger, the seed dropping through the hole 66 in the chute. The air in the cylinder 40 is then reversed to open the fingers after which the air in the cylinder 62 is reversed to retract the gate with the pitted fruit falling off the cushion onto the chute, completing an operation. Suitable compensation for arcuate movement of the lever 36 and toggle links is provided, one suitable means consisting in pivoting the cylinders as indicated at 68 to the base, and at 69 to the bracket 70.

Thus fruit holding means is provided for a fruit pitting machine, one which will center and hold the seed through the intervening fruit skin without rupturing the skin, one which will positively hold the seed in the fruit in line with the path of the ejection plunger, and one in which the seeds and pitted fruits are automatically discharged and segregated.

I claim:
1. Means for centering and holding the seed in a fruit for pitting in a fruit pitting machine comprising, a pitting plunger, a base, a bore formed through said base and a discharge gate located in said bore and having a seed passage, four gripping fingers pivotally mounted intermediately of their lengths and in equi-angular relation about said bore and with one end of each of the fingers having a rounded gripping end for gripping the seed in a fruit through the intervening skin and with the rounded ends spaced laterally a distance substantially equal to the diameter of the rounded ends for flow of dislocated fruit body therebetween, a sector gear integral with each finger at the other end, and an internal ring gear meshing with said sector gears for arcuately moving said one end to gripping position and for retracting said fingers, and means operable and connected with said ring gear for moving said ring gear in respective directions for closing and retracting said one end respectively for gripping the seed and for releasing the pitted fruit; said gate being hinged to the underside of said base, a bracket depending from said base, a toggle joint connecting between said gate and said bracket, a pneumatic jack mounted on the underside of said base and having its piston rod connected to said toggle joint and a supply of air under pressure and control means therefor for said jack for operating said toggle joint for respectively closing and locking said gate for a pitting operation and for retracting said gate for release and discharge of the pitted fruit.

2. Seed centering, orienting and gripping means for a fruit pitting machine comprising, a pitting plunger for said pitting machine, a base having a bore in axial alignment with said pitting plunger, a gate hinged to the bottom of said base and having a cushion seat projecting into said bore and having an axial seed passage, an internal ring gear rotatably supported axially on said base and including a plurality of equi-angularly spaced rollers cooperating with the periphery of said ring gear, four equi-angularly spaced sector gears pivotally supported on said base within said ring gear, and meshing with said ring gear, each of said sector gears having finger extensions terminating in rounded ends and arcuately movable to gripping position about said pitting plunger through operation of said ring gear, and having spaces therebetween when in gripping position for flow of dislocated fruit body when the seed is gripped by said rounded ends through the skin of the fruit, an operating arm on said ring gear for operation in respective directions for advancing and retracting said gripping fingers, a support depending from said base, and a toggle joint cooperating between said support and said gate, and operating means for said toggle joint for selectively closing and locking said gate to said base for pitting, and for retracting said gate for discharge of the pitted fruit.

References Cited in the file of this patent

UNITED STATES PATENTS

| Number | Name | Date |
|---|---|---|
| 166,142 | Read et al. | July 27, 1875 |
| 1,502,929 | Tuttle | July 29, 1924 |
| 1,725,223 | Sturges | Aug. 20, 1929 |
| 1,725,224 | Sturges | Aug. 20, 1929 |
| 1,822,381 | Smith | Sept. 8, 1931 |
| 2,342,131 | Erickson | Feb. 22, 1944 |
| 2,485,653 | Peel | Oct. 25, 1949 |
| 2,612,197 | Giordano | Sept. 30, 1952 |

FOREIGN PATENTS

| Number | Country | Date |
|---|---|---|
| 566,168 | France | Nov. 19, 1923 |
| 637,661 | France | Feb. 6, 1928 |